June 5, 1956 W. M. KAUFFMANN 2,748,562
AFTERCOOLER WATER CONTROL FOR INTERNAL COMBUSTION ENGINES
Filed Oct. 30, 1953
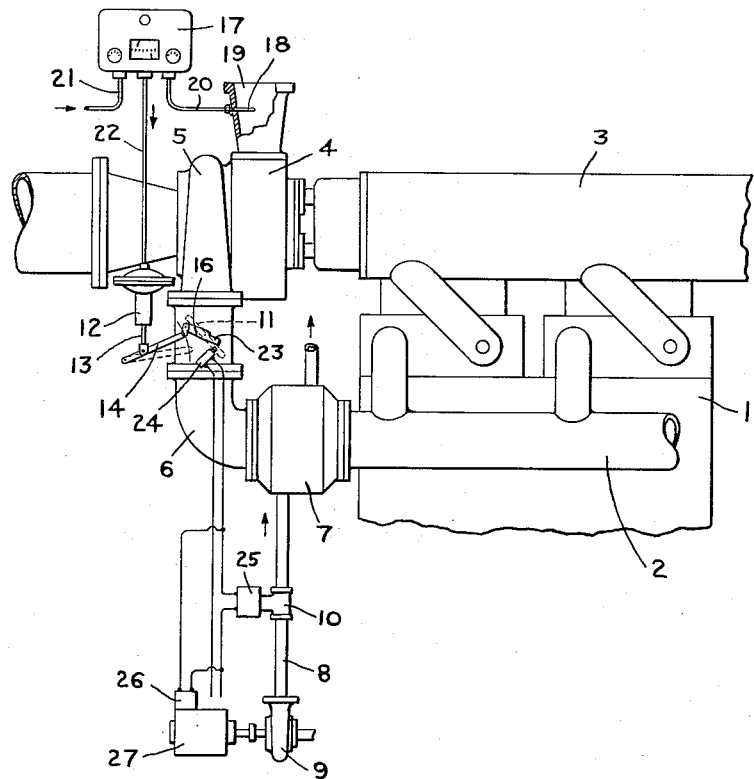
WILLIAM M. KAUFFMANN
*INVENTOR.*
BY
*atty*

United States Patent Office 2,748,562
Patented June 5, 1956

2,748,562

AFTERCOOLER WATER CONTROL FOR INTERNAL COMBUSTION ENGINES

William M. Kauffmann, Hamburg, N. Y., assignor to Worthington Corporation, Harrison, N. J., a corporation of Delaware Application October 30, 1953, Serial No. 389,320

6 Claims. (Cl. 60—13)

This invention relates to internal combustion engines and more particularly to mechanism for controlling the flow of cooling water through the aftercooler or heat exchanger employed to cool the turbo-compressed combustion and scavenging air delivered to the combustion chambers of a supercharged internal combustion engine. To avoid detonation in supercharged dual fuel, spark ignition high compression gas or analogous internal combustion engines it is necessary, when the engine is operating from approximately three-quarters to full load or maximum output, to cool the turbo-compressed air delivered to the combustion chambers of the engine, but such cooling is unnecessary when the engine is operating at lesser loads, except at such times as a dual fuel engine or other internal combustion engine is operating as a diesel engine when cooling of the air is beneficial at all loads from no load to full load.

The present invention comprises means for automatically cutting off the flow of cooling water through the aftercooler, thus saving water and its cost, when the engine is operating on gas engine operation at partial loads below a predetermined percentage of its full load or maximum output.

More specifically, the invention comprises means operated by operation of the air supply valve which controls delivery of air to the engine cylinders to cut off the flow of cooling water through the aftercooler when the load on the engine falls below a predetermined percentage of the full load.

With these and other objects in view, as may appear from the accompanying specification, the invention consists of various features of construction and combination of parts which will first be described in connection with the accompanying drawing showing a diagrammatic view of the control mechanism for controlling the flow of cooling water to the aftercooler which cools the turbo-compressed air delivered to the combustion chambers of an internal combustion engine, and the features forming the invention will be specifically pointed out in the claims.

Referring more particularly to the drawing, 1 indicates a part of the cylinders of a multi-cylinder internal combustion engine having an air intake manifold 2 and a discharge manifold 3. The discharge gases or exhaust from the cylinders of the internal combustion engine, which may be a dual fuel engine, high compression spark ignition gas engine or the like drives an exhaust turbine 4 which in turn operates a turbo-compressor 5. The compressor 5 compresses air which is delivered to the intake manifold 2 and consequently to the combustion chamber (not shown) of the engine to provide a turbocharged engine. The air from the turbo-compressor passes through a suitable conduit 6 to the air intake manifold 2 and an aftercooler 7 is interposed in the conduit 6. The aftercooler 7 is of any approved surface heat exchanger construction wherein the air discharged by the turbo-compressor 5 is cooled by cooling water circulated through the aftercooler. The cooling water is delivered to the aftercooler 7 from a pipe or conduit 8 under suitable pressure generated by the pump 9 and a valve 10 is interposed in the pipe 8 for controlling the flow of water to the aftercooler.

Means are provided in the present invention for cutting off the flow of water to the aftercooler when the engine is operating below certain or predetermined speeds or load conditions and this means cooperates with the mechanism for controlling the flow of the turbo-compressed air to the air intake manifold 2. A valve 11 is interposed in the conduit 6 and is operated by the pressure actuated mechanism 12. The pressure actuated mechanism 12 is in the form of a diaphragm motor unit including an operating rod 13 connected by suitable linkage 14 to a link 16 which is mounted on the pivoting rod of the valve 11. Pressure for actuating the diaphragm motor unit 12 (which is of any approved form that may be purchased upon the open market) is delivered to the diaphragm motor unit through an automatic controller unit 17. This automatic controller 17 is a mechanism which measures the value of a variable quantity or condition and operates to correct it to a selected value, and such controllers are well known and may be purchased upon the open market, being manufactured by The Bristol Company, Moore Products Company, and others. In the application of the controller 17 in the present invention it utilizes the temperature of the exhaust gases of the engine through a temperature sensitive element 18 (which is also well known and may be purchased upon the open market) mounted in the exhaust outlet 19 of the turbine 4. Variances in the temperature of the exhaust gases of the engine are transmitted as pressure by and through the temperature sensitive element 18 and its tube 20 to the controller 17 and acts as a control pressure which regulates the delivery of pressure air from the inlet conduit 21 and the outlet conduit 22 to the diaphragm motor unit 12 and consequently controls operation of the diaphragm motor unit. Thus the operation of the butterfly valve 11 is controlled by variances in the temperature of the exhaust gases of the engine to control the quantities of air delivered to the combustion chambers (not shown) of the engine cylinder 1 in accordance with the load on the engine. It has been found that there is a relation between the exhaust temperatures and the best engine performance at various loads and the present air throttling control makes use of this characteristic.

The link or lever 16 has an extension 23 thereon which is located so that when the butterfly valve 11 reaches a certain position in its movement the extension 23 will operate an electrical switch 24. The switch 24 is connected in the electrical circuit with the solenoid 25 which operates the valve 10 so that when the butterfly valve 11 is in a position to supply a limited quantity of air to the engine during operation of the engine at loads below a predetermined percentage of full load the switch 24 will be closed to energize the solenoid 25 and operate the valve 10 to cut off flow of water to the aftercooler 7.

The switch operating extension 23 which is connected to the operating lever 16 of the valve 11 is so located relative to the switch 24 that when the valve 11 is in full open position or in a position to provide a load operation of the engine, as a gas engine, above a predetermined percentage of full load the extension 23 will operate the switch 24 and close an electrical circuit through the solenoid 25 which will open the valve 10 and allow cooling water to flow through the aftercooler 7. When the valve 11 is moved by its operating lever 14 into position to provide a partial load operation of the engine below the above mentioned predetermined percentage (for example, below ¾ load) the lever 16 moves the extension 23 out of engagement with the switch 24, at which time the switch operates to break the electrical circuit through the solenoid 25. This breaking of the circuit through the solenoid 25 permits the solenoid to act to close the valve 10 and cut off the flow of water to the aftercooler 7.

If it is so desired, a solenoid operated switch 26 of any approved type which may be purchased upon the open market may be connected to the motor 27 which operates the pump 9 and connected in the circuit with the solenoid 25 and the switch 24 so that when the valve 10 is closed the motor 27 will be deenergized for arresting operation of the pump 9.

It will be understood that the invention is not to be limited to the specific construction or arrangement of parts shown, but that they may be widely modified within the invention defined by the claims.

What is claimed is:

1. In combination with a turbocharged internal combustion engine including an inlet air manifold and an exhaust manifold and a turbo-compressor, an air conduit connecting the turbo-compressor and inlet manifold, an air valve in said conduit for controlling delivery of air to the engine, an aftercooler in said conduit, means for delivering cooling water to the aftercooler, means operated by predetermined operating conditions of the engine for operating said air control valve, and means operated by predetermined positioning of the air-controlling valve for controlling delivery of cooling water to said aftercooler.

2. In combination with a turbocharged internal combustion engine including an inlet air manifold and an exhaust manifold and a turbo-compressor, an air conduit connecting the turbo-compressor and inlet manifold, an air valve in said conduit for controlling delivery of air to the engine, an aftercooler in said conduit, means for delivering cooling water to the aftercooler including a pump, and a water valve interposed between the discharge of the pump and said aftercooler, means operated by predetermined operating conditions of the engine for operating said air valve, and means operated by said air valve operating means for operating said water valve at predetermined positions of the air valve.

3. In combination with a turbocharged internal combustion engine including an inlet air manifold and an exhaust manifold and a turbo-compressor, an air conduit connecting the turbo-compressor and inlet manifold, an air valve in said conduit for controlling delivery of air to the engine, an aftercooler in said conduit, means for delivering cooling water to the aftercooler including a pump, and a water valve interposed between the discharge of the pump and said aftercooler, means operated by predetermined operating conditions of the engine for operating said air valve, and means operated by said air valve operating means for operating said water valve at predetermined positions of the air valve, said lastnamed means controlling operation of said pump.

4. In combination with a turbocharged internal combustion engine including an inlet air manifold and an exhaust manifold and a turbo-compressor, an air conduit connecting the turbo-compressor and inlet manifold, an air valve in said conduit for controlling delivery of air to the engine, an aftercooler in said conduit, means for delivering cooling water to the aftercooler including a pump, means operated by predetermined operating conditions of the engine for operating said air valve, and means operated by said air valve operating means for controlling operation of said pump at predetermined positions of the air valve.

5. In combination with a turbocharged internal combustion engine including an inlet air manifold and an exhaust manifold and a turbo-compressor, an air conduit connecting the turbo-compressor and inlet manifold, an air valve in said conduit for controlling delivery of air to the engine, an aftercooler in said conduit, means for delivering cooling water to the aftercooler including a solenoid operated valve for controlling delivery of water to the aftercooler, an electrical switch, and means operated at predetermined positioning of said air valve for operating said switch to control energizing of said solenoid.

6. In combination with a turbocharged internal combustion engine including an inlet air manifold and an exhaust manifold and a turbo-compressor, an air conduit connecting the turbo-compressor and inlet manifold, an air valve in said conduit for controlling delivery of air to the engine, an aftercooler in said conduit, means for delivering cooling water to the aftercooler including a solenoid operated valve for controlling delivery of water to the aftercooler, means operated by predetermined operating conditions of the engine for operating said air valve, an electrical switch, and means operated by said air valve operating means for operating said switch at predetermined positioning of the air valve to control energizing of said solenoid, a pump for pumping cooling water, an electric motor for driving said pump, a solenoid actuated switch for controlling energizing of said motor, said firstnamed switch controlling energizing of said solenoid-operated motor-controlling switch.

References Cited in the file of this patent

UNITED STATES PATENTS

| 1,879,685 | Jaczko | Sept. 27, 1932 |
| 2,581,334 | Reggio | Jan. 1, 1952 |
| 2,600,736 | Crooks | June 17, 1952 |